Dec. 11, 1962 H. R. LENZ 3,067,668
PHOTOPRINT WASHERS
Filed Feb. 18, 1960 4 Sheets-Sheet 1

INVENTOR.
HERBERT R. LENZ
BY *Alfred W Betchft*
ATTY.

Dec. 11, 1962    H. R. LENZ    3,067,668
PHOTOPRINT WASHERS
Filed Feb. 18, 1960    4 Sheets-Sheet 2

INVENTOR.
HERBERT R. LENZ
BY
ATTY.

Dec. 11, 1962 H. R. LENZ 3,067,668
PHOTOPRINT WASHERS
Filed Feb. 18, 1960 4 Sheets-Sheet 3

INVENTOR.
HERBERT R. LENZ
BY Alfred W. Petchaft
ATTY.

Dec. 11, 1962 H. R. LENZ 3,067,668
PHOTOPRINT WASHERS
Filed Feb. 18, 1960 4 Sheets-Sheet 4

*INVENTOR.*
HERBERT R. LENZ
BY
ATT'Y

United States Patent Office 3,067,668
Patented Dec. 11, 1962

3,067,668
PHOTOPRINT WASHERS
Herbert R. Lenz, 306–310 E. Commercial St.,
Lebanon, Mo.
Filed Feb. 18, 1960, Ser. No. 9,601
21 Claims. (Cl. 95—97)

This invention relates in general to new and useful improvements in photoprint washers, and in particular to hydraulically operated photographic print washers.

It is the primary object of this invention to provide an hydraulically operated photographic print washer wherein the hydraulic system which causes rotation also acts to prevent the photoprints from bunching or matting, and also holds the prints in a uniform and orderly circle between the center and side of the washer.

It is also an object of the present invention to provide a photographic print washer of the type stated in which the speed of rotation of the print washer may be varied within the practical limits.

It is another object of the present invention to provide a photographic print washer of the type stated having means for the axial rotation of the individual print in one direction within the washer as the washing pan and all the prints in a load rotate in an opposite direction.

It is a further object of the present invention to provide a washer of the type stated having improved means for ejecting waste water from the washing pan, even to a very shallow depth required for washing one or two small prints, and keeping the sides of the washing pan clean during rotation.

It is an additional object of the present invention to provide a photographic print washer having improved and simplified means for supporting the rotatable washing pan in such a manner that it may be readily and conveniently removed and replaced whenever the need arises.

An additional object of the present invention is to provide a photographic print washer having an improved means for draining the washer and for regulating the water level within the rotating pan.

With the above and other objects in view, my invention resides in the novel features of form, construction, arrangement, and combination of parts presently described and pointed out in the claims.

In the accompanying drawings (4 sheets)—

Referring now in more detail and by reference characters to the drawings, which illustrate a preferred embodiment of the present invention. A designates a photographic print washer comprising a stationary tub $t$ having an annular side-wall 1 which is preferably provided at its upper or perpheral margin with an outwardly curled bead 2, and having a flat bottom wall 3, provided with a centrally located aperture 4. Mounted in the aperture 4 and welded to the bottom wall 3 is a plate 5 and welded thereto is an upstanding co-axial rod 6. Mounted in and extending through the side-wall 1, just above the bottom wall 3, is a radially projecting horizontal nipple 7, and swingably threaded thereon is a pipe elbow 8 provided at its opposite end with a short length of projecting pipe 9, in turn, provided at its outer end with a second elbow 10. Interposed between the nipple 7 and the end face of the elbow 8 is a compression spring 11 for holding the elbow 8 and its associated fittings at any desired position. Attached to the outer end of elbow 10 is a rotatable spout-fitting 12 having an upwardly presented aperture 13. It should be noted, in this connection, that the length of the pipe 9 should be such that the open end of elbow 10 will be positioned substantially above the desired liquid level within the tub $t$ and it will also be apparent that, by swinging the pipe 9 and its associated elbows 8 and 10 downwardly, the tub $t$ may be either entirely drained or the liquid level thereof adjusted as the case may be. The aperture 13 is a provided in the spout-fitting 12 as an anti-siphon device whereby siphoning will be prevented when water flows through the draining system.

Figure 1:
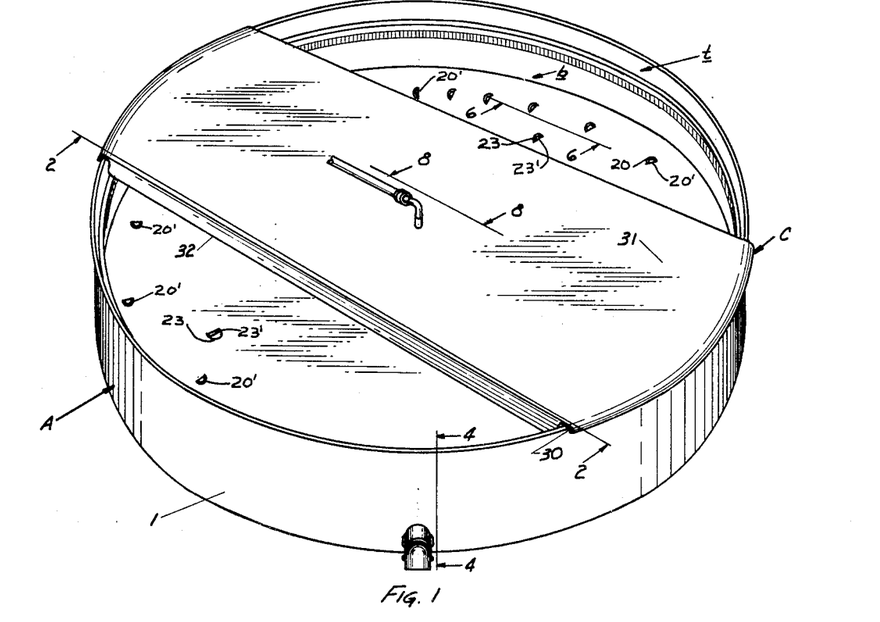
FIG. 1 is a perspective view of a photoprint washer constructed in accordance with and embodying the present invention.
Figure 2:
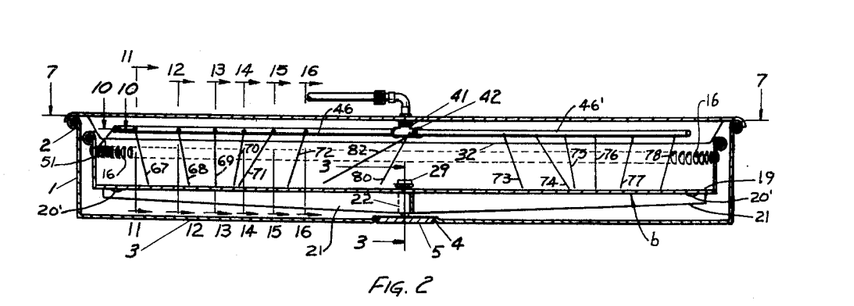
FIG. 2 is a sectional view of the washer taken along line 2—2 of FIG. 1.
Figures 3, 6:
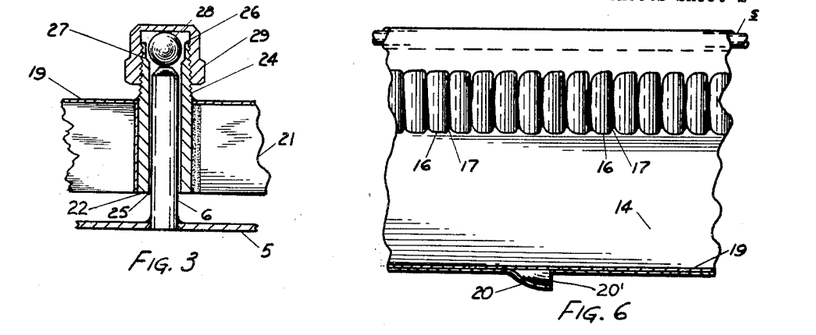
FIG. 3 is a fragmentary sectional view taken along line 3—3 of FIG. 2.
FIG. 6 is a sectional view of the inner-pan taken along line 6—6 of FIG. 1.
Figures 4, 5:
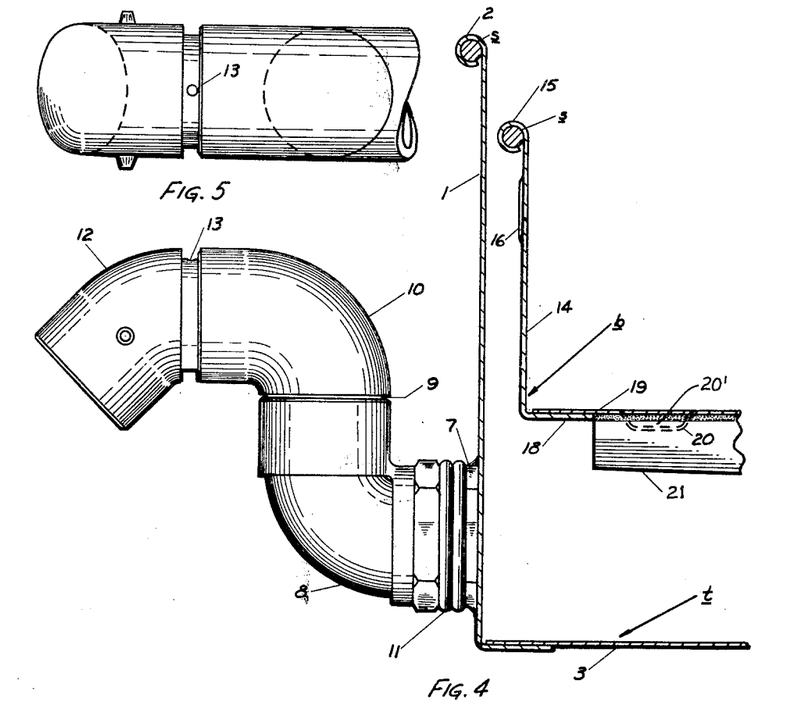
FIG. 4 is a fragmentary sectional view of the washer taken along line 4—4 of FIG. 1.
FIG. 5 is a top plan view of the drainage spout depicted in FIG. 4.
Figures 7, 8, 9, 10, 17:
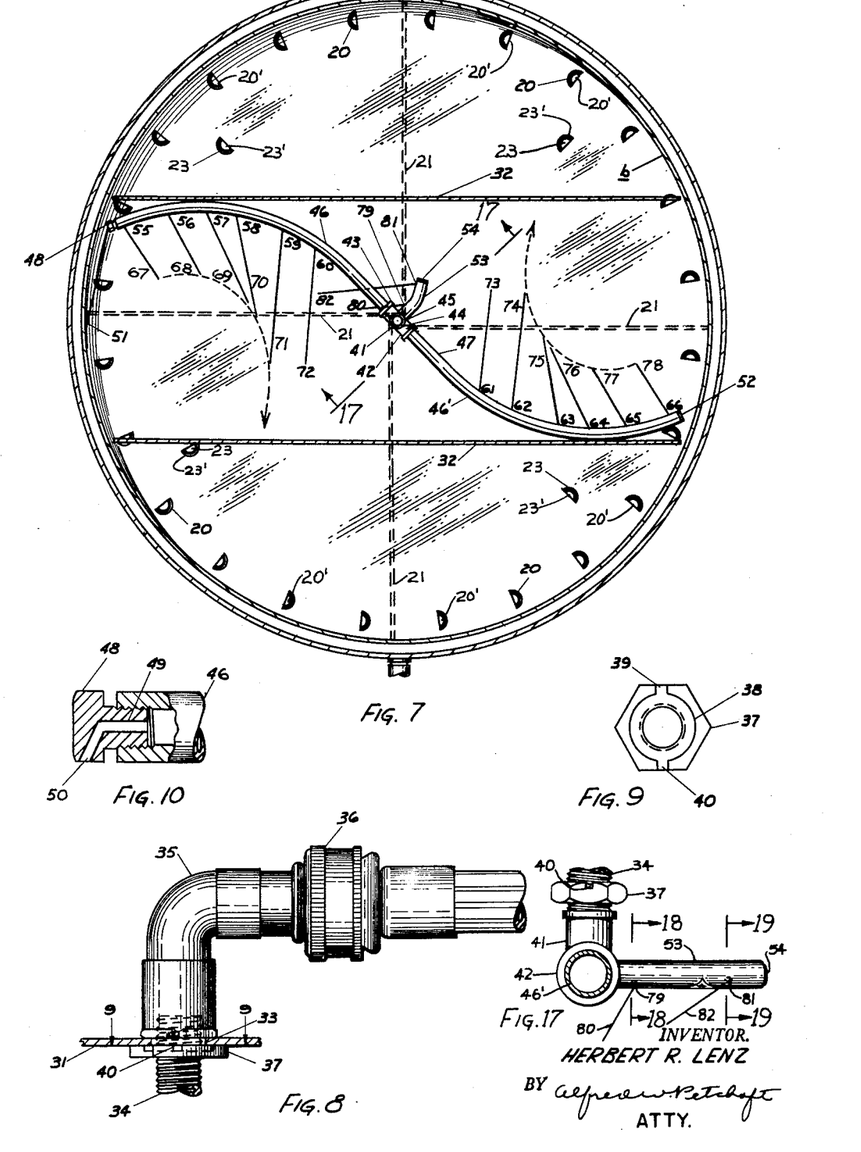
FIG. 7 is a sectional view of the washer taken along line 7—7 of FIG. 2.
FIG. 8 is a sectional view of the hose-receiving assembly taken along line 8—8 of FIG. 1.
FIG. 9 is a top plan view of the nut which holds the hose-receiving assembly against the bridge-bar.
FIG. 10 is a sectional view of the head nut which is taken along line 10—10 of FIG. 2.
FIG. 17 is a fragmentary sectional view taken along line 17—17 of FIG. 7.
Figure 11:
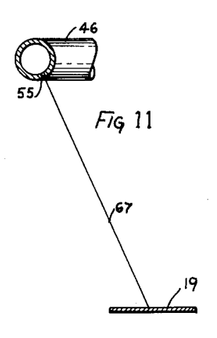
FIGS. 11, 12, 13, 14, 15, and 16, are fragmentary sectional views taken along lines 11—11, 12—12, 13—13, 14—14, 15—15, and 16—16, respectively, of FIG. 2.
Figure 12:
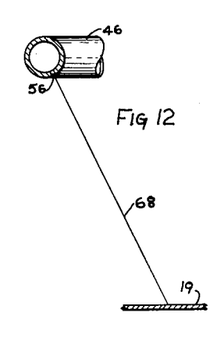
Figure 13:
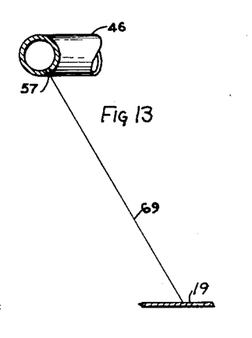
Figures 14, 15, 16:
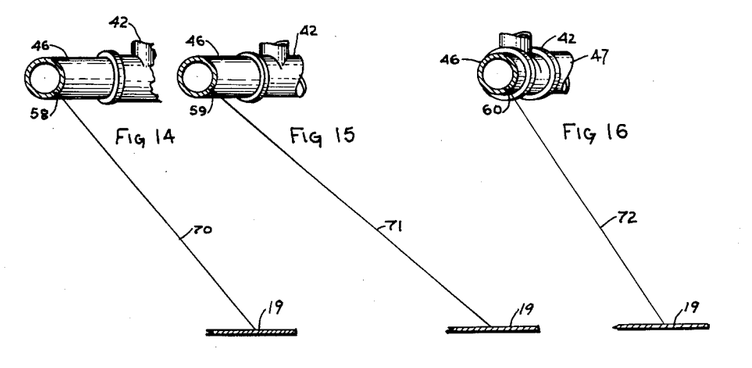
Figure 18:
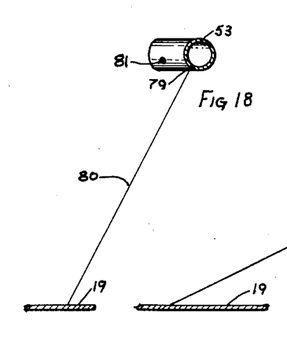
FIGS. 18 and 19 are fragmentary sectional views taken along lines 18—18 and 19—19, respectively, of FIG. 17.
Figure 19:
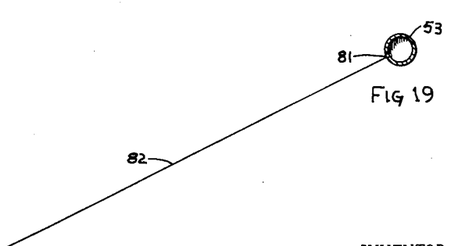

Provided for disposition within the tub $t$ is an annular tray or so-called basket $b$ which comprises an annular side wall 14 somewhat smaller in diameter and substantially shorter in height than the side wall 1 of tub or pan $t$ and preferably, though not necessarily, provided at its upper margin with a rolled reinforcing and finishing bead 15. Circumferentially contained within beads 15 and 2 are reinforcing rods $s$ to provide shape and stability for tub $t$ and tray $b$. Along the upper portion of wall 14 of tray $b$ and forming an annular ring thereon is a series of vane-forming is a series of vane-forming indentations 16 of substantial height and having flat faces 17 forming the sides of each recess. Disposed along the lower periphery of wall 14 is an inwardly bent annular flange 18 to which the bottom 19 of tray $b$ is securely attached. Disposed in a uniformly spaced annular series around the bottom wall 19, and as close as possible to its periphery, are louvers 20 which are deflected downwardly and form elongated louvered vents 20'. Secured to the under face of bottom wall 19 is a plurality of depending reinforcing ribs or braces 21, each extending inwardly from a point adjacent to the outer circumference of the bottom wall 19 to a point of tangential abutment upon the outer face of a centrally located quill 22. Each rib 21 is endwise abuttingly secured along its transverse margin to the lateral face of the next adjacent rib 21, thus embracingly enclosing the quill 22 in an interlockingly reinforced manner, as best seen in FIGS. 3 and 7. Since the bottom wall 19 is formed of a large circular piece of sheet metal, there is a tendency for it to cup downwardly to a slight degree and form so-called low points in the mid-sections of the segmental areas into which the bottom wall 19 is subdivided by the ribs 21 and, in order to provide for complete drainage of the tray $b$, additional louvers 23 are lanced into the bottom wall at each of these low points between the ribs, thereby forming elongated louver vents 23'. The louvers 20 and 23 are inclined downwardly and rearwardly with respect to the direction of rotation of the tray b, so that the louver vents 20', 23', will, in effect, open rearwardly, whereby to cause used water and waste material, such as sediment and the like, to flow downwardly and outwardly through the louver vents 20', 23', without recirculation back into the tray b.

Located within quill 22 is a longitudinally extending bore 25 of slightly greater diametral size than the rod 6, said bore being terminated at its upper end with a counter-bore 26 of substantially larger diametral size than bore 25. Disposed within the counter-bore 26 above shoulder 27 at the intersection of bore 25 and counter-bore 26 is a ball-bearing 28 of slightly smaller diametral size than counter-bore 26 and substantially larger in diametral size than bore 25. Bearing 28 is retained in place between the counter-bore 26 and shoulder 27 by cap 29 which is threadedly mounted on the threaded end 24 of the quill 22. The quill 22, as shown, has a somewhat greater over-all length than the over-all length of the rod 6 and thus the cap 29 may be removed from the threaded end 24 of quill 22, and the downwardly pressed margin of the quill 22 will come to rest on the upper face of the bottom 3 of tub t. It will be evident that the upper or threaded end 24 of the quill 22 projects above the upper end of the rod 6 forming therewith a cup-like recess wherein the ball-bearing 28 may be placed to simplify assembly and greasing. If grease is placed in the cap 29 and the latter is threaded into place, the grease will be forced down into counter-bore 26 around the ball-bearing 28 and between the bearing surface of the quill 22 and the rod 6. At the same time, the transverse wall of the cap 29 will come into engagement with the ball-bearing 28, lifting the tray b and supporting it in freely rotating position, as best seen in FIG. 3.

Removably mounted on, and extending diametrally across, the tub t in the plane 7 of the top thereof is a bridge-bar C having arcuate ends 30 adjusted to fit snugly over the head 2 forming the periphery of tub t. The bridge-bar C integrally includes a top plate 31 and depending side flanges 32. The top plate 31 is centrally provided with an aperture 33 for receiving an externally threaded pipe nipple 34 which projects vertically through the aperture 33 and is threaded into the lower end of an elbow 35 which is, in turn, provided at its other end with a conventional hose coupling 36. On the under side of the plate 31, the nipple 34 is provided with a lock nut 37 having an annular counterbore 38 upon its upper face, the latter being provided with diametrally opposed radial slots 39 and 40 to afford drainage from the counter-bore 38, as best seen in FIG. 8. When the nipple 34 and elbow 35 are secured to the plate 31 by drawing the lock nut 37 into snug-fitting relationship with the bottom of plate 31, any water which may leak from the threaded joint at this point will flow through the aperture 33 into the counter-bore 38 and flow through the slots 39 and 40 into the tray b. Threaded upon lower end of the nipple 34 is the center leg 41 of a small pipe-T 42 having lateral legs 43 and 44 and being provided with an aperture 45 drilled in one side, midway between the lateral legs 43 and 44. It should be noted that the center lines of the legs 43 and 44 and aperture 45 lie substantially in the same plane. Mounted in, and extending horizontally outwardly from the legs 43 and 44 are curved spray-tubes 46 and 46' which extend between side flanges 32 of bridge-bar C and together form a symmetrical S-shaped spraypipe 47. Threadedly mounted in the end of the spraytube 46 is a hollow hexagon-headed plug 48, an inwardly opening longitudinal bore 49 which extends partially through the plug 48 and is intersected by a second bore 50 which opens outwardly upon one of the faces of the hexagon-headed plug 48, thereby forming a passage through which a jet spray 51 of water may pass. The direction of the stream can be varied by rotation of plug 48. Threadedly inserted in the outer end of the spraytube 46' is a solid plug 52. Mounted in the aperture 45 of the T 42 is a short spraypipe 53 terminated with a solid plug 54, said pipe being bent at approximately the center of its length so as to form approximately a one-hundred thirty-five degree angle with itself.

The spraytubes 46 and 46' are drilled at varying radial locations along their length to form a series of small spray orifices 55, 56, 57, 58, 59, 60, 61, 62, 63, 64, 65, and 66, which respectively form high velocity jet-sprays of water 67, 68, 69, 70, 71, 72, 73, 74, 75, 76, 77, and 78, directed inwardly and downwardly towards the center of tray b at different angles. As will be seen by reference to FIG. 7, if a line drawn between the outer tips of the tubes 46 and 46' through the center of the T 42 be considered as the "axis of curvature" of the spraypipe 47, then the angles between correspondingly paired jet-sprays 67 and 78, are the same and are relatively oblique to the axis of curvature. Similarly, the angles between jet-sprays 68 and 77 are less oblique, and the angles between succeeding pairs of correspondingly paired jet-sprays toward the center of spraypipe 47, through jet-sprays 71 and 74, become progressively less oblique. The different angles of the jet-sprays with respect to the horizontal bottom of tray b are shown in FIGS. 11 to 16, inclusive. For instance, the correspondingly paired jet-sprays 69 and 76, 70 and 75, and 71 and 74 become progressively "flatter," that is to say, more nearly horizontal, toward the center of the spraypipe 47. Jet-sprays 71 and 74, located midway between the center and the outer ends of the spraypipe 47, are the "flattest" of all the sprays. The next consecutive jet-sprays 72 and 73, located about midway between jet-sprays 71 and 74 and the center of the spraypipe, are, in turn, much "steeper" or similar in pitch to jet-sprays 69 and 76. From the above and by reference to FIG. 7 it can be seen that the spray orifices 55, 56, 65, 66 define a first set of orifices which form a first set of jet-sprays including the jet-sprays 67, 68, 77, 78. The spray orifices 57, 58, 63, 64 define a second set of orifices forming a second set of jet-sprays 69, 70, 75, 76, and the spray orifices 59, 60, 61, 62 define a third set of orifices forming a third set of jet-sprays 71, 72, 73, 74.

Drilled in the short spraypipe 53, between the angular bend therein and the T 42, is a small spray orifice 79, providing a jet-spray 80 inclined slightly at a very steep angle toward the bottom 19 of tray b. Also drilled in the spraypipe 53 between the angular bend and solid plug 54 is another small jet-spray orifice 81, which provides another jet-spray 82 also inclined toward the jet-sprays of spraytube 46 and extending at a more gently inclined angle to the bottom 19 of the tray b. The spray orifices 79, 81 define a fourth set of jet-sprays which include the jet-sprays 80, 82.

The various jet-sprays are angled and directed so as to exert a four-way control over the photographic prints being washed. Jet sprays 67, 68, 77, and 78 impel the prints toward the bottom as well as slightly inward and forward, thereby applying a force to the prints which holds them away from the walls 14 of tray b. The jet-sprays 80 and 82, by spinning the prints off center in a counter-clockwise direction, impel the prints away from the center of tray b as the latter rotates and, since these jet-sprays are the largest of the jet-sprays, the greatest volume of water is induced near the center of the washer and induces an open center in the print load. Having once created an open center, these jet-sprays 80 and 82 force water and injected air beneath the prints in the washer, lifting the corners and sides of the prints nearest the center of the washer high in the water and, coacting with jet-sprays 72 and 73, cause the individual prints to rotate in a clockwise direction while moving in a spaced annular series around the washer in a counter-clockwise direction with the rotation of the tray b. The corresponding pairs of jet-sprays 69 and 76, 70 and 75, and 71 and 74, being directed at progressively flatter angles with respect to the horizontal, provide the greatest driving force for causing the prints to assume an "organized" ring around the tray $b$ in which the prints are spaced in nearly uniform order. As a result of the hydraulic forces exerted by the jet-sprays 69 and 76, 70 and 75, and 71 and 74, the ring of prints will rotate with the tray $b$ in a counter-clockwise direction. The jet-sprays 72 and 73, being pitched at an angle corresponding to jet-sprays 69 and 76, or much steeper than either jet-sprays 70 and 75, or 71 and 74, provide a reduced driving force for propelling the prints, but, at the same time, coacting with jet-sprays 80 and 82, provide a force for axially turning the individual prints in a clockwise direction about their own geometric centers while they are bodily moving in the "organized" ring. Because the consecutive jet-sprays on each side of jet-sprays 71 and 74 are each progressively flatter in angle as they are positioned closer to jet-sprays 71 and 74, all the jet-sprays are supplementary, one to another, in creating a concentrated spearhead-like driving force, or a slip-stream of wash water, as shown diagrammatically by the dotted arrows in FIG. 7, midway between the center and the perimeter of tray $b$. Not only do these jet-sprays automatically organize all the prints in a load into a uniform circle midway between the center and the perimeter of the washing tray by propelling the prints and the tray in a counter-clockwise direction, each consecutive print being positioned above and slightly ahead of another with its leading edge down and its trailing edge up, but these jet-sprays also, because of their progressively flattened angles toward the apex jet-sprays 71 and 74, slowly turn the individual prints clockwise on their own axes. This clockwise axial rotation of the individual prints is extremely important to prevent the prints from bunching or matting, to insure complete separation, to hold the prints equally spaced in a more uniform and orderly "organized" ring midway between the center and the perimeter of the washing tray, and to repeatedly expose all edges of the individual prints to the direct washing action of the jet-sprays. The driving force for rotation of tray $b$ is effectively controlled by the jet-spray 51 which may be oriented against the sides 17 of the vane-forming indentations 16 against the side walls 14 of tray $b$ somewhat in the manner of a turbine. The forward driving force of jet-spray 51 with respect to tray $b$ is beneficial in preventing a small number of prints from bunching while being washed in very shallow water. By reversing the direction of the jet-spray 51, the rotational velocity of tray $b$ can be reduced, if desired, in order to more effectively wash a capacity load of prints in deep water. It also should be noted that the water forming the jet-spray 51 flows downwardly against the walls 14 of tray $b$ and thereby washes said walls as they rotate. The combination of sprays as described provides a means whereby a group of photographic prints, which are to be washed, are rotated in almost uniformly spaced circular relation within a moving body of wash water which is also rotating at approximately the same velocity.

The louvered vents 20' in the bottom 19 of tray $b$ are lanced in equally spaced positions as close as possible to the perimeter to provide a means for the dirty water and any solid waste material washed from the prints to escape into tub $t$, thereby acting as a self-flushing device. Louvered vents 20' not only make it possible to lower the operational water level in tray $b$ shallow enough to satisfactorily wash a very few small prints, but they contribute to an increase in washing speed because the heavy hypo contamination and sediment swept to the perimeter of tray $b$ by centrifugal force readily drops through the louvered vents 20' without recirculation. Louvered vents 23' are supplementary to louvered vents 20', there being one vent lanced at the lowest point in bottom 19 between each adjacent pair of reinforcing braces 21 for draining the tray $b$ dry.

It should be understood that changes and modifications in the form, construction, arrangement, and combination of the photoprint washer may be made and substituted for those shown and described without departing from the nature and principle of my invention.

Having thus described my invention, what I claim and desire to secure by Letters Patent is:

1. A photoprint washer for washing photographic prints and the like, said washer comprising a stationary tub, a tray rotatably mounted in said tub, said tray having an annular wall and a bottom, an annular ring of vane-forming vertically elongated indentations disposed about said annular wall, a first spraypipe rigidly mounted above the tray, means for supplying water under pressure to the first spraypipe, said first spraypipe having a first set of orifices forming directed jet sprays for causing said tray to rotate, said first set of jet-sprays including a plurality of separate jets radially spaced from the center of the tray and being directed downwardly and inwardly, a second set of orifices forming directed jet-sprays coacting with said first set of orifices to supply water for washing said photoprints, said second set of jet-sprays including a plurality of separate jets radially spaced from the center of the tray and being directed downwardly and outwardly, a second spraypipe rigidly mounted on said first spraypipe at right angles thereto, said second spraypipe having a set of orifices provided with jets and forming directed jet sprays at right angles to the coacting jet sprays of said first and second orifices for causing said photographic prints to axially spin as they rotate about the tray, means for supplying water under pressure to said second spray pipe, a nozzle adjustably mounted in one end of said first spraypipe and being movable to any selected position between limits, said nozzle being adapted at one limit to direct a jet-spray against said indentations to increase the speed of rotation of said tray and being adapted at the other limit to direct a jet-spray against the indentations in such a manner as to retard the speed of rotation of said tray, said nozzle also being adapted in an intermediate adjustable position to direct jet-sprays therefrom entirely below the annular series of indentations so as to cleanse the walls of said tray, without materially affecting the speed of rotation of the tray, louvered vents disposed in the bottom of said tray to discharge waste and excess water from said tray into said stationary tub, and drainage means operatively mounted on said tub for draining water from said tub.

2. A photoprint washer for washing photographic prints and the like, said washer comprising a stationary tub, a tray rotatably mounted in said tub, said tray having an annular wall and a bottom, an annular ring of vane-forming vertically elongated indentations disposed about said annular wall, a first spraypipe rigidly mounted above the tray, means for supplying water under pressure to the first spraypipe, said first spraypipe having a first set of orifices forming directed jet-sprays for causing said tray and the prints therein to rotate in one direction, said first set of jet-sprays including a plurality of separate jets radially spaced from the center of the tray and being directed downwardly and inwardly, said first set of orifices also applying a force to the prints which holds them away from the walls of said tray, a second set of orifices to provide the greatest driving force midway between the center and the walls of said tray for causing the prints to form a ring around the tray, which ring rotates in said direction, a second set of jet-sprays including a plurality of separate jets radially spaced from the center of the tray and being directed downwardly and outwardly, a third set of orifices directed nearer the center of said tray for turning the individual prints in the opposite direction about their own axes while they are circling bodily in the first direction as a part of the ring, said third set of jet-sprays including a plurality of separate jets radially spaced from the center of the tray and being directed downwardly and outwardly, a second spraypipe rigidly mounted on said first spraypipe at right angles thereto, said second spraypipe having a fourth set of orifices provided with jets and forming directed jet sprays at right angles to the coacting jet sprays of said first, second, and third orifices for causing said photographic prints to axially spin as they rotate about the tray, means for supplying water under pressure to said second spraypipe, and a nozzle adjustably mounted in one end of said first spraypipe and being movable to any selected position between limits, said nozzle being adapted at one limit to direct a jet-spray against said indentations to increase the speed of rotation of said tray and being adapted at the other limit to direct a jet-spray against the indentations in such a manner as to retard the speed of rotation of said tray, said nozzle also being adapted in an intermediate adjustable position to direct a jet-spray therefrom entirely below the annular series of indentations so as to cleanse the walls of said tray, without materially affecting the speed of rotation of the tray, louvered vents disposed in the bottom of said tray to discharge waste and excess water from said tray into said stationary tub, and drainage means operatively mounted on said tub for draining water from said tub.

3. A photoprint washer for washing photographic prints and the like, said washer comprising a stationary tub, a tray rotatably mounted in said tub, said tray having an annular wall and a bottom, an annular ring of vane-forming vertically elongated indentations disposed about said annular wall, a first spraypipe rigidly mounted above the tray, means for supplying water under pressure to the first spraypipe, said first spraypipe having a first set of orifices forming a plurality of downwardly and inwardly directed jet-sprays for causing said tray to rotate, a second set of orifices forming a plurality of downwardly and outwardly directed jet-sprays co-acting with said first set of orifices to supply water for washing said photoprints, a second spraypipe rigidly mounted on said first spraypipe at right angles thereto, said second spraypipe having a set of orifices provided with jets and forming directed jet sprays at right angles to the coacting jet sprays of said first and second orifices for causing said photographic prints to axially spin as they rotate about the tray, means for supplying water under pressure to said second spraypipe, a nozzle adjustably mounted in one end of said first spraypipe and being movable to any selected position between limits, said nozzle being adapted at one limit to direct a jet-spray against said indentations to increase the speed of rotation of said tray and being adapted at the other limit to direct a jet-spray against the indentations in such a manner as to retard the speed of rotation of said tray, said nozzle also being adapted in an intermediate adjustable position to direct a jet-spray therefrom entirely below the annular series of indentations so as to cleanse the walls of said tray, without materially affecting the speed of rotation of the tray, a first series of annularly located louvered vents formed in the bottom wall, a second series of annularly located louvered vents formed in the bottom wall, in inwardly disposed relation to the first series of louvered vents, said louvered vents being adapted for discharging water from the tray to the tub, and drainage means for removing water from the tub.

4. A photoprint washer for washing photographic prints and the like, said washer comprising a stationary tub, a tray rotatably mounted in said tub, said tray having an annular wall and a bottom, an annular ring of vane-forming vertically elongated indentations disposed about said annular wall, a spraypipe rigidly mounted above the tray, means for supplying water under pressure to the spraypipe, said first spraypipe having a first set of orifices forming a plurality of downwardly and inwardly directed jet-sprays for causing said tray to rotate, a second set of orifices forming a plurality of downwardly and outwardly directed jet-sprays coacting with said first set of orifices to supply water for washing said photoprints, a second spraypipe rigidly mounted on said first spraypipe at right angles thereto, said second spraypipe having a set of orifices provided with jets and forming directed jet sprays at right angles to the coacting jet sprays of said first and second orifices for causing said photographic prints to axially spin as they rotate about the tray, means for supplying water under pressure to said second spraypipe, a nozzle adjustably mounted in one end of said spraypipe and being movable to any selected position between limits, said nozzle being adapted at one limit to direct a jet-spray against said indentations to increase the speed of rotation of said tray and being adapted at the other limit to direct a jet-spray against the indentations in such a manner as to retard the speed of rotation of said tray, said nozzle also being adapted in an intermediate adjustable position to direct jet-sprays therefrom entirely below the annular series of indentations so as to cleanse the walls of said tray, without materially affecting the speed of rotation of the tray, a first series of annularly located louvered vents formed in the bottom wall near its perimeter, said louvered vents being adapted for centrifugally discharging waste water from the rotating tray into the tub without recirculation, a second series of disposed annularly located louvered vents formed in the bottom wall in inwardly disposed relation to the first series of louvered vents, said second series of louvered vents being adapted for discharging water from the tray at its lowest points into the tub for draining the tray dry, and drainage means for removing water from the tub.

5. A photoprint washer comprising a stationary tub having an annular side wall and a base plate, an upwardly extending cylindrical rod rigidly attached to said base plate at its center, said rod being elongated, a tray having a bottom wall and an annular side wall of smaller diametral size and smaller vertical height than the annular side wall of said tub, a downwardly opening tubular member rigidly attached to the bottom of said tray and being of greater length than said upwardly extending rod, said downwardly extending member having a first annular internal wall extending upwardly from the bottom thereof and being of slightly larger diametral size than said upwardly extending rod, a second annular internal wall extending downwardly from the top of said member and being of slightly larger diametral size than said first annular wall, said first annular wall and second annular wall being joined by a horizontal annular shoulder, a ball-bearing of slightly larger diametral size than said first annular wall and of slightly smaller diametral size than said second annular wall, said ball-bearing for loose-fitting disposition in the pocket formed by the second annular internal wall and the shoulder, a cap threadedly mounted on the upper portion of said member whereby to retain said ball-bearing in said pocket, whereby when said member is placed on top of the rod, the ball-bearing contacts the top of said rod and the bottom of said cap holding said tray above the bottom plate of said tub in freely rotatable position, spraypipe means including first hydraulic means for causing said tray to rotate and second means for cooperating with said first hydraulic means to supply water for washing said photoprints, support means for supporting said spraypipe means above said stationary tub, first drainage means disposed in the bottom of said tray near its perimeter to centrifugally remove waste and excess water from said tray even to a very shallow depth without recirculation or to drain the tray dry into said stationary tub, and second drainage means operatively mounted on said tub for draining water from said tub.

6. A photographic print washer for washing photographic prints and the like, said washer comprising a stationary tub, a tray rotatably mounted in said tub, said tray having an annular wall and a bottom, an annular ring of vane-forming indentations disposed about said annular wall having relatively flat radially presented surfaces, spraypipe means including first orifice means for causing said tray to rotate, second orifice means located near the end of said spraypipe for urging said photographic prints away from the peripheral wall of said tray and providing a supplementary rotational force to said tray, third orifice means next inwardly adjacent to second orifice means, each orifice means being inclined more toward horizontal as the radial distance from the center of the spraypipe means decreases, to provide the greatest driving force midway between the perimeter and the center of said tray for propelling the prints forward with, but independently of, the rotation of said tray, each orifice means being inclined more toward vertical as the radial distance from the center of the spraypipe means decreases, each of said orifice means providing a plurality of jet-sprays for axially turning the individual photographic prints opposite to the direction of the photographic print load and tray rotation, auxiliary spraytube means mounted on said spraypipe means at a right angle to said spraypipe means and having a fourth orifice means for hydraulically imparting a force to said photographic prints at approximately right angles to the combination of forces imparted by said first, second, and third orifice means in said spraypipe means, whereby to cause the photographic prints to axially spin as they rotate about said tray, the fourth orifice means of said auxiliary spraytube means being located in radially spaced relation to the center of said spraypipe means, each of said first, second, and third orifice means being inclined more toward vertical as the radial distance from the centrally located mounting point of said auxiliary spraytube means decreases, a nozzle operatively mounted on said spraypipe for cooperating with said annular ring of vane-forming indentations on said annular wall of said tray whereby to apply additional rotational force to said stationary tub, means for supporting said spraypipe means, first drainage means disposed in the bottom of said tray near its perimeter to centrifugally remove waste and excess water from said tray even to a very shallow depth without recirculation or to drain the tray dry into said stationary tub, and second drainage means operatively mounted on said tub for draining water from said tub.

7. A photographic print washer for washing photographic prints and the like, said washer having a stationary tub and a tray rotatably mounted in said tub; first spraypipe means including a first set of orifices for directing jet-sprays into said tray to rotate it and a second set of orifices adapted to direct jet-sprays into the tray to rotate the photographic prints about their own axes, second spraypipe means including a set of orifices located at ninety degrees to said first and second set of orifices, support means for supporting said first and second spraypipe means above said stationary tub, first drainage means disposed in the bottom of said tray near its perimeter to centrifugally remove waste and excess water from said tray without recirculation and optionally to drain the tray dry into said stationary tub, and second drainage means rotatably mounted in the wall of said tub for draining water from said tub, said second drainage means including an elongated trap-type fitting to permit adjustment of the water level in said tray.

8. In a photographic print washer including a tray and a stationary tub, means for rotatably mounting said tray within said tub, said means including an upwardly extending cylindrical rod fixedly attached to said tub substantially at its center and being elongated; a downwardly extending tubular member mounted on the bottom of said tray substantially at the center and being of greater length than said upwardly extending rod, said member being further provided with a first and second annular walls internally joined by an annular shoulder, said first annular wall being the lowermost annular wall and having slightly larger diametral size than said rod, said second annular wall being of larger diametral size than said first annular wall and being coaxial with said first annular wall, the combination of said second annular wall and the annular shoulder forming a pocket within said member, a cap removably secured to the top of said member over said pocket and having a downwardly presented surface, and a ball-bearing for loose-fitting disposition within said pocket and being of larger diametral size than said first annular wall whereby said ball-bearing is retained within said pocket when said tray is removed, said bearing being for engagement with the upper surface of said rod and downwardly presented surface of said cap whereby to rotatably mount said tray within said tub.

9. In a photographic print washer a rotatable tray and a first spraypipe means attached to a water source whereby to provide an hydraulic force for rotating the tray, means for providing an additional hydraulic force for causing said prints to spin as they are rotated with said tray, said means including a second spraypipe mounted on said first spraypipe and being angularly located with respect thereto, said second spraypipe having orifices for directing jet-sprays of water on said prints at a substantially perpendicular direction to the sprays from said first spraypipe, means for supplying said second spraypipe with water under pressure, and means for supporting said first and second spraypipes above said tray.

10. In a photographic print washer, a rotatable tray and spraypipe means attached to a water source whereby to provide an hydraulic force for rotation, means for providing an additional hydraulic force for causing said prints to spin as they are rotated with said tray, said means including a second tubular spraypipe operatively connected to said first spraypipe at the approximate center of said first spraypipe and extending outwardly therefrom whereby to receive water under pressure from said first spraypipe, a plurality of orifices located in said spraypipe so as to direct sprays of water outwardly and downwardly therefrom whereby to force said photoprints away from the center of said tray and to exert a force thereon which is substantially perpendicular to the combined forces exerted on said photoprints by said first spraypipe, the combination of forces from said first and second spraypipes causing said photoprints to axially spin as they are rotated with said tray, and a plug mounted in the end of said second spraypipe.

11. In a photographic print washer including a rotatable tray; leakage draining means comprising a support fixedly mounted above said tray and including a flat surface having an aperture, water supply means mounted in and extending through said aperture, and a spraypipe operatively connected to said water supply means below said flat surface, securing means for attaching said water supply means to said support, said securing means being disposed below said support, and escape means comprising an escape nut operatively mounted on said water supply means including an aperture and an annular escape channel with radial extensions to permit any water supply leakage to flow through said aperture and through said escape means into said tray.

12. In a photographic print washer including a rotatable tray; leakage drainage means comprising a support fixedly mounted above said tray and including a flat surface having an aperture, water supply means mounted in and extending through said aperture, a spraypipe operatively connected to said water supply means below said flat surface, and securing means for attaching said water supply means to said support, said securing means including a nut threadedly mounted on the portion of said water supply means which extends through said aperture whereby to secure said water supply means to said support, said nut being provided with an escape channel which extends downwardly from the upper surface of the nut and is annular about the water supply means, said channel also having a plurality of radial extensions which penetrate the peripheral walls of said nut whereby if any water should collect on said support due to a leaky hose or spillage, or the like, said water will flow downward through said aperture into said escape channel and outwardly therefrom into said tray.

13. In a photographic print washer for washing photographic prints and the like, said washer including a rotatable tray positioning and moving means comprising a first spraypipe operatively mounted above said tray and being provided with hydraulic means for presenting a rotational force to said tray, said positioning and moving means including spray means operatively mounted above said tray and comprising a first set of spray-jets located substantially near the peripheral limits of said tray, said first set of spray-jets including a plurality of separate jets radially spaced from the center of said tray and being directed downwardly and inwardly, the downward angle of said separate jets in the first set of spray-jets increasing as the radial spacing from the center of said tray decreases, said spray means also having a second set of spray-jets located between said first spray-jets and the center of said tray, said second set of spray-jets also including a plurality of separate jets radially spaced from the center of said tray and being directed downwardly and outwardly, the downward angle of each of the jets in said second set of spray-jets decreasing as the radial distances from the center of said spraypipe decreases, means for supplying said first and second spray means with water under pressure whereby said first and second spray means will co-act separating and uniformly spacing said photographic prints and impart a rotational force thereon which will cause said photographic prints to rotate about the center of said tray and at the same time will cause said tray to rotate, a second spraypipe rigidly mounted on said first spraypipe at right angles thereto, said second spraypipe having a set of orifices provided with jets and forming directed jet sprays at right angles to the coacting jet sprays of said first and second orifices for causing said photographic prints to axially spin as they rotate about the tray, and means for supplying water under pressure to said second spraypipe.

14. In a photographic print washer including a rotatable tray positioning and moving means comprising a first spraypipe operatively mounted above said tray and being provided with hydraulic means for presenting a rotational force to said tray, said positioning and moving means including first spray means operatively mounted above said tray and comprising a plurality of first spray-jets located substantially near the peripheral limits of said tray, each of said first jets being radially spaced from the center of said tray and being directed downwardly and inwardly at the same angle, a second spray means operatively mounted above said tray and comprising a plurality of second spray-jets located between said first spray-jets and a point midway between the periphery and the center of said tray, each of said second spray-jets also being radially spaced from the center of said tray and being directed downwardly and outwardly, the downward angle of each of said second spray-jets increasing as the radial distances from the center of said first spraypipe decreases and the outward angle of each of said second spray-jets also increasing, due to the bend in said first spraypipe, as the radial distances from the center of said first spraypipe decreases, and a means for supplying said first and second spray means with water under pressure whereby said first and second spray means will co-act separating and uniformly spacing said photoprints into an organized ring and impart a rotational force thereon which will cause said organized ring of photoprints to rotate about the center of said tray and at the same time will cause said tray to rotate, a third spray means operatively mounted above said tray and comprising one or more of third spray-jets located midway between said second spray-jets and the center of said tray, each of said third spray-jets also being radially spaced from the center of said tray and being directed downwardly and outwardly, the downward angle of each of said third spray-jets, if more than one, decreasing as the radial distances from the center of said spraypipe decreases, a means for supplying third spray means with water under pressure whereby said third spray means will co-act with said first and second spray means to propel said organized ring of photoprints and said tray in a counter-clockwise direction while at the same time to slowly turn the individual photographic prints in a clockwise direction about their own axes while they are circling bodily in the first direction as part of said organized ring, a second spraypipe mounted on said first spraypipe and being angularly located with respect to said first spraypipe, said second spraypipe having a fourth spray means operatively mounted above said tray and comprising a plurality of fourth spray-jets located adjacent to the center of said tray substantially perpendicular to said first, second and third spray-jets, also being radially spaced from the center of said tray and being directed downwardly and outwardly, the downward angle of each of said fourth spray-jets decreasing as the radial distances from the center of said second tubular spraypipe decreases, and a means for supplying fourth spray means with water under pressure whereby said fourth spray means will spin the prints off center in a counter-clockwise direction and, after impelling the prints away from the center of the tray and into the ring of prints, will co-act with said third spray means to turn the individual photographic prints in a clockwise direction about their own axes while they are circling bodily in the first direction as part of said organized ring.

15. In a photographic print washer including a rotatable tray; photoprint positioning and moving means comprising a first spraypipe operatively mounted above said tray and being provided with hydraulic means for presenting a rotational force to said tray, said positioning and moving means including spray means operatively mounted on said spraypipe and comprising a first set of spray-jets located substantially above the outer margin of said tray, said first set of spray-jets including a plurality of separate jets radially spaced from the center of said spraypipe and being directed downwardly and inwardly, the downward angle of each of said separate jets in the first set of spray-jets increasing as the radial spacing from the center of said spraypipe decreases, said spray means also having a second set of spray-jets located between said first spray-jets and the center of said spraypipe, said second set of spray-jets also including a plurality of separate jets radially spaced from the center of said spraypipe and being directed downwardly and outwardly, the downward angle of each of the jets in said second set of spray-jets decreasing as the radial distances from the center of said spraypipe decrease, a second spraypipe mounted on said first spraypipe and being angularly located with respect to said first spraypipe, said second spraypipe having a third set of spray-jets, said third spray-jets being substantially perpendicular to said first and second spray-jets, and means for supplying said first and second spraypipes with water under pressure whereby said first and second spray means will co-act to separate and space uniformly said photoprints, while at the same time imparting a rotational force thereto causing said photoprints to rotate about the center of said tray, said first and second spray means also co-acting with said hydraulic means to said spraypipes to provide a supplementary rotational force to said tray.

16. In a photographic print washer including a rotatable tray; photoprint positioning and moving means comprising a spraypipe operatively mounted above said tray and being provided with hydraulic means for presenting a rotational force to said tray, said positioning and moving means including first spray means operatively mounted on said spraypipe and comprising a plurality of first spray-jets located substantially above the outer margin of said tray, each of said first spray-jets being radially spaced from the center of said spraypipe and being directed downwardly and inwardly at the same angle, a second spray means operatively mounted on said spraypipe and comprising a plurality of second spray-jets located between said first spray means and a point midway between the outer ends and the center of said spraypipe, each of said second spray-jets also being radially spaced from the center of said spraypipe and being directed downwardly and outwardly, the downward angle of each of said second spray-jets increasing as the radial distance from the center of said spraypipe decreases, and means for supplying said spraypipe with water under pressure, whereby said first and second spray means will co-act to separate and space uniformly said photoprints in an organized ring while at the same time imparting a rotational force thereto causing said organized ring of photoprints to rotate about the center of said tray, said first and second spray means also co-acting with said hydrualic means to said spraypipe to provide a supplementary counter-clockwise rotational force to said tray, a third spray means operatively mounted on said spraypipe and comprising one or more of third spray-jets located between said second spray means and the center of said spraypipe, each of said third spray-jets also being radially spaced from the center of said spraypipe and being directed downwardly and outwardly, the downward angle of each of third spray-jets, if more than one, decreasing as the radial distance from the center of said spraypipe decreases, and a means for supplying said spraypipe with water under pressure whereby said third spray means will co-act with said first and second spray means to separate and uniformly space said photoprints in an organized ring while at the same time imparting a counter-clockwise rotational force thereto causing said organized ring of photoprints to rotate about the center of said tray, said third spray means also co-acting with said hydraulic means in said spraypipe to provide supplementary counter-clockwise rotational force to said tray while at the same time slowly turning the individual photoprints in a clockwise direction on their own axes while they are circling bodily in the first direction as part of said organized ring, a second tubular spraypipe operatively mounted above said tray, and a fourth spray means operatively mounted on said second tubular spraypipe and comprising a plurality of fourth spray-jets located adjacent to the center of said first spraypipe substantially perpendicular to said first, second and third spray-jets, also being radially spaced from the center of said first spraypipe and being directed downwardly and outwardly, the downward angle of each of said fourth spray-jets decreasing as the radial distances from the center of said first spraypipe decreases, and a means for supplying said second spraypipe with water under pressure whereby said fourth spray means will spin said photoprints off center in a counter-clockwise direction and, after impelling the prints away from the center of said tray and into the organized ring of photoprints, will co-act with said third spray means to turn the individual photographic prints in a clockwise direction about their own axes while they are circling bodily in the first direction as part of said organized ring.

17. The photographic print washer of claim 16 wherein the rotatable tray is operatively mounted within a stationary tub having an annular side wall and a base plate, the tray having a bottom wall and an annular side wall of smaller diametral size and smaller vertical height than the annular side wall of said tub.

18. The photographic print washer of claim 16 wherein the rotatable tray is operatively mounted within a stationary tub having an annular side wall and a base plate, the tray having a bottom wall and an annular side wall of smaller diametral size and smaller vertical height than the annular side wall of said tub, an upwardly extending cylindrical rod rigidly attached to the base plate of said tub at its center portion, a downwardly opening tubular member rigidly attached to the bottom of said tray and being of greater length than said upwardly extending rod, said downwardly extending member having a first annular internal wall extending upwardly from the bottom thereof and being of slightly larger diametral size than said upwardly extending rod, and a second annular wall extending downwardly from the top of said member and being of slightly larger diametral size than said first annular wall forming a central pocket, a ball bearing mounted within said pocket, a cap member mounted atop said ball bearing for holding said tray above the bottom plate of said top in a freely rotatable position.

19. The photographic print washer of claim 16 wherein the rotatable tray is operatively mounted within a stationary tub having an annular side wall and a base plate, the tray having a bottom wall and an annular side wall of smaller diametral size and smaller vertical height than the annular side wall of said tub, an upwardly extending cylindrical rod rigidly attached to the base plate of said tub at its center portion, a downwardly opening tubular member rigidly attached to the bottom of said tray and being of greater length than said upwardly extending rod, said downwardly extending member having a first annular internal wall extending upwardly from the bottom thereof and being of slightly larger diametral size than said upwardly rod, and a second annular internal wall extending downwardly from the top of said member and being of slightly larger diametral size than said first annular wall forming a central pocket, said first annular wall and second annular wall being joined by a horizontal annular shoulder, a ball-bearing of slightly larger diametral size than said first annular wall and of slightly smaller diametral size than said second annular wall mounted within said pocket, said ball-bearing being sized for loose-fitting disposition in the pocket formed by the second annular internal wall and the shoulder, a cap member threadedly mounted in the upper portion of said member whereby to retain said ball-bearing in said pocket, whereby when said member is placed on top of the rod, the ball-bearing contacts the top of said rod and the bottom of said cap holding said tray above the bottom plate of said tub in freely rotatable position.

20. The photographic print washer of claim 16 wherein the rotatable tray is operatively mounted within a stationary tub, means for discharging waste and water from said tray into said tub, said means including a plurality of louvered vents located in the bottom of said tray, each having downwardly inclined louver-forming flange, said flanges being also inclined rearwardly with respect to the direction of rotation of the tray so the vents are presented in such a direction whereby water from the tray is discharged into the tub as a result of rotation of the tray.

21. The photographic print washer of claim 16 wherein the rotatable tray is operatively mounted within a stationary tub, means for continuously controlling the water level within said tray, said means including a trap type drain pivotally mounted on said top, and means for preventing siphoning once water flow has commenced in said drain.

References Cited in the file of this patent

UNITED STATES PATENTS

| 1,779,428 | Grant | Oct. 28, 1930 |
| 2,062,704 | Forsyth | Dec. 1, 1936 |
| 2,321,435 | Swartz | June 8, 1943 |
| 2,325,255 | Lenz | July 27, 1943 |
| 2,577,136 | Lenz et al. | Dec. 4, 1951 |